May 13, 1958 M. R. CREASY 2,834,617
STUFFING BOX FOR SOLIDS HANDLING PUMPS
Filed June 10, 1955
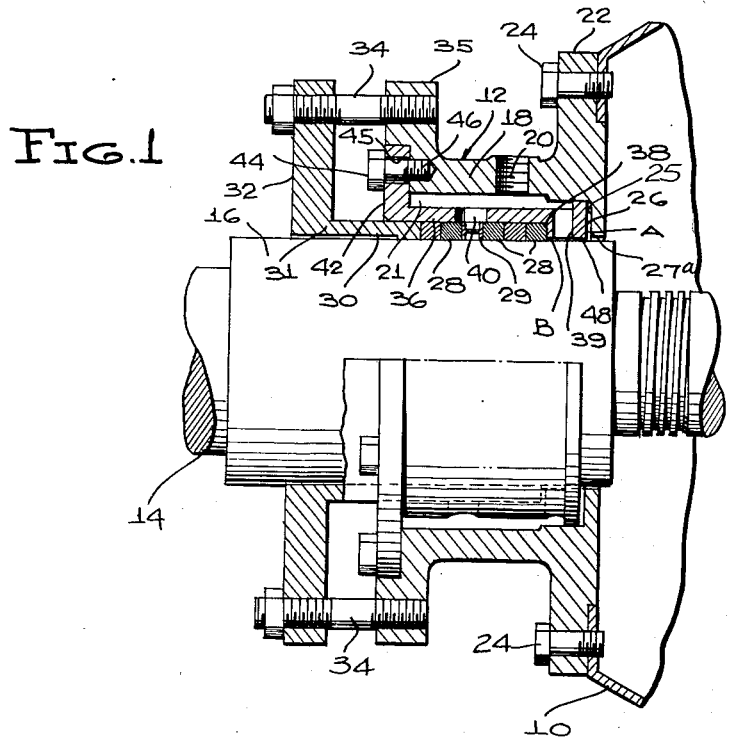
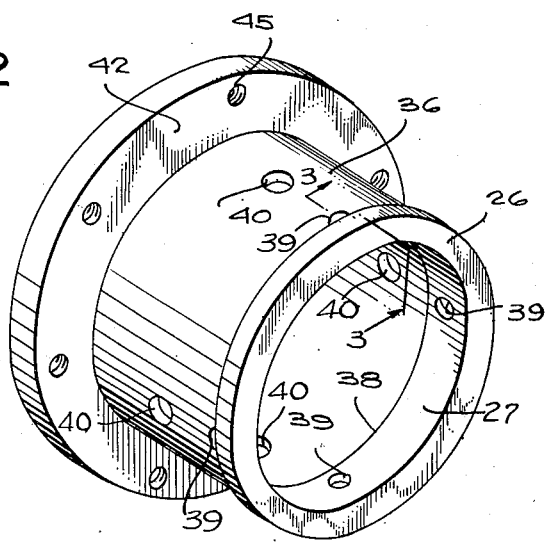
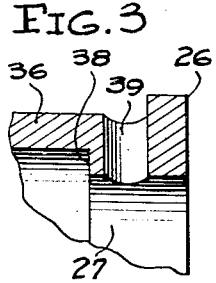
INVENTOR.
MACAJAH R. CREASY
BY
McMorrow, Berman & Davidson
ATTORNEYS United States Patent Office 2,834,617
Patented May 13, 1958

2,834,617

STUFFING BOX FOR SOLIDS HANDLING PUMPS

Macajah R. Creasy, Lakeland, Fla.

Application June 10, 1955, Serial No. 514,539

1 Claim. (Cl. 286—8)

Customarily, a solids handling pump includes a shaft and an impeller housing, with the shaft projecting out of the impeller housing and having its projecting end extending through a stuffing box one end of which is connected to the impeller housing. Within the stuffing box there is provided a water seal chamber, packing extending about the shaft within the chamber, a gland engaging the packing at one end, and a lantern ring engaging the packing at its other end, to hold the packing under compression between the ring and gland.

Conventionally, the lantern ring is disposed at the impeller-housing-adjacent end of the stuffing box. This is done in order that a substantial flow of water will pass through the lantern ring into the impeller housing to counteract any tendency of solids from entering the stuffing box from the impeller housing.

A serious disadvantage in the conventional construction results from the fact that the face or side of the lantern ring that is adjacent the impeller housing is subjected to a high pressure, due in part to the seal water and in part to the pressure generated by the action of the pump. This pressure is exerted in a direction axially of the ring and packing, and since the ring is free to slide in an axial direction in conventional construction, the axially exerted pressure is transmitted to the packing and cannot be relieved by backing off the gland in respect to the packing.

Therefore, the packing, though originally compressed between the ring and gland to an adjusted, predetermined extent, becomes subject, during operation of the pump, to compression forces that often are beyond its capacity. As a result, some of these forces are transmitted radially, inwardly of the packing and shaft, resulting in an excessive pressure against the shaft. Rubbing or frictional engagement between the shaft and packing, that is, so-called "rubbing velocity" is as a result heightened to such a value that heat is generated to a correspondingly excessive extent. Temperatures are thereby caused to rise to such a point as to destroy the lubricant with which the packing is impregnated, and due to this the textile material of the packing is affected adversely.

Due to these undesirable characteristics in conventional stuffing box constructions used in the environment specified, it has been found necessary to pack large sixteen inch pumps used in mining operations as often as every one hundred hours of operation.

The main object of the present invention is to provide a generally improved stuffing box of the type described so designed that under no circumstances will the pressures exerted against the lantern ring by the seal water and the pump action be transmitted to the packing, it being proposed to so design the stuffing box that the packing may be compressed to a predetermined, adjusted extent when initially inserted, and thereafter maintained at all times under no more than a proper amount of compression, all without adverse effect upon the sealing action either of the packing or of the seal water.

Another object is to provide a stuffing box having the beneficial characteristics noted, that does not require modification or redesign of the conventional shaft and impeller housing.

A further object is to obtain the desirable end noted above without any, or at least only a very small, increase in the manufacturing cost of the stuffing box.

A further object is to reduce pressures exerted on the packing by the water seal to no more than a small fraction of those presently exerted on the packing by said seal, so as to not only prevent rapid deterioration of the packing, but also to insure to the maximum extent that the water seal pressure will exist or occur only in a direction radially, inwardly of the packing to properly lubricate the packing.

Other objects will appear from the following description, the claim appended thereon, and from the annexed drawing, in which like reference characters designate like parts throughout the several views and wherein:

Figure 1 is a view of the stuffing box partly in longitudinal section and partly in side elevation in association with a shaft and impeller housing, that are illustrated fragmentarily;

Figure 2 is a perspective view of the lantern ring and sleeve; and

Figure 3 is a fragmentary cross sectional view, taken along line 3—3 of Figure 2.

At 10 there has been designated the impeller housing of a conventional, solids handling pump, at 12 a stuffing box connected to one end of the housing, at 14 a shaft extending into the housing and projecting out of said end thereof through the stuffing box, and at 16 a shaft sleeve circumposed about the shaft within the stuffing box. For the purposes of the present application, the sleeve may properly be considered as a part of the shaft. Accordingly, the term "shaft" as used hereinafter will be understood as applying not only to the shaft proper designated at 14, but also to the sleeve 16 provided thereon.

Stuffing box 12 includes a cylindrical body 18 formed intermediate its ends with a threaded opening 20 to which is connectable the outlet end of a pipe, not shown, through which seal water is directed under pressure into the body, to flow into an annular water seal chamber 21 defined by recessing the inner surface of the body side wall outwardly from the shaft and from the packing that is circumposed about the shaft, as will be described in detail hereinafter.

At one end, body 18 is formed with an outwardly directed annular flange 22 connected by circumferentially spaced bolts or screws 24 to the adjacent end of the impeller housing 10. A lantern ring has been designated at 26 and extends about the shaft in closely spaced relation to the impeller-housing-adjacent end of the water seal chamber 21. A small space 25 is left between the ring and the end wall of the chamber, and communicating with this space and with the interior of the impeller housing is one end of an annular, narrow, axially extending space 27a defined between the stuffing box wall and the shaft. Seal water directed into chamber 21 flows under pressure through space or port 27a into the impeller housing, to purge solids that otherwise might tend to flow into the stuffing box.

Circumposed about the shaft in engagement with the inner side of an inner ring 27 is a cylindrical packing composed of side by side packing rings 28 and an auxiliary lantern ring 29 which will allow a normal amount of water seal pressure to occur in a direction radially, inwardly of the shaft for proper lubrication of the packing.

A gland 30 includes a cylindrical portion 31 abutting at one end against that end of the packing remote from inner ring 27. Formed on the other end of portion 31 is an outwardly directed circumferential flange 32 connected by bolts 34 to an outwardly directed circumferential flange 35 on the adjacent end of the body 18. By tightening upon or loosening bolts 34, gland 30 is shifted in an axial direction toward or away from the packing, to compress the packing to a predetermined extent between inner ring 27 and the gland.

Integral with the inner side of lantern ring 26 and inner ring 27 is a sleeve 36 extending about the packing 28 in contact therewith, and spaced outwardly from the shaft for abutting of the packing against a shoulder 38 defined at the meeting point of ring 27 and sleeve 36. Formed in the sleeve (Figure 2) are circumferential extending rows of water inlet openings 40, and water directed into the chambers 21 under pressure is forced through said openings, and into the auxiliary lantern ring 29 to exert a pressure radially, inwardly of the packing to lubricate the same.

A flange 42 is formed on the end of the sleeve remote from ring 26, and defines an outer end wall of chamber 21. By means of bolts 44, extended through openings 45 of flange 42 into threaded recesses 46, flange 42 is fixedly secured to body 18, at the location of flange 35.

Formed in the inner ring 27 at locations spaced uniform distances apart about the circumference thereof are radial openings 39 communicating between the water seal chamber and a narrow, annular space 48 defined between the shaft and the inner periphery of the inner ring.

Ordinarily, water forced into chamber 21 under pressure not only exerts a radial, inwardly directed force through openings 39 and space 48 to flow through space 27 into the impeller housing, but also exerts a pressure at A against the impeller-housing-adjacent side of the lantern ring 26. This pressure is exerted in an axial direction to the left in Figure 1, and shifting the lantern ring against the packing 28, compresses the packing to an undesirable extent causing high friction between the shaft and packing with attendant wear of the packing, requiring frequent replacement.

However, in accordance with the invention, the pressure exerted at A can have no effect against the packing. This is true because said pressure is transmitted from lantern ring 26 through the length of sleeve 36 and flange 42 to the fixed connection between the flange 42 and body 18, the pressure thus being taken by the body 18 rather than by the packing. There is, thus, no axial pressure exerted on the packing other than the predetermined amount resulting from adjustment of the gland 30 in an axial direction, except for a minute amount of pressure exerted at B within space 48 against the adjacent end of the packing. Pressure of the gland 30 will be adjusted so as to impart a greater compression on the packing than the pressure exerted thereon by the seal water or the pressure of the liquid from the impellor housing 10, and since the clearance space 48 is quite small, the axial force exerted by the seal water pressure on the packing will be reduced to a very small fraction of that imposed on the packing in conventional stuffing box construction. Thus, replacement of the packing will be required only at highly infrequent intervals, as compared to the necessity of making a replacement for every one hundred hours of pump operation, as is presently the case.

If some deformation due to erosive action of the liquid from the impellor housings and the particles carried therein, should occur on the inner face of ring 27, defining the shoulder 38, the packing could be readily adjusted by the gland 30 so as to accommodate itself to the deformed surface.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

A stuffing box for a solids handling pump including an impeller housing and a shaft, comprising a cylindrical tubular body carried by said housing in circumposed relation about said shaft, said body having an annular longitudinal recess in its inner surface and opening through one end thereof, a cylindrical sleeve arranged within said body in spaced surrounding relation to said shaft, said sleeve and the recess in said body defining a water seal chamber, an outer lantern ring carried by said sleeve adjacent one end thereof and defining one end wall for said chamber adjacent the other end of said body, there being a port through said body and in communication with said lantern ring, an inner ring carried by said sleeve adjacent said one end thereof to define at its juncture with said sleeve a shoulder, packing extending about said shaft disposed in the space between said sleeve and said shaft and in abutting relation at one end against said shoulder, an outwardly extending flange on said sleeve adjacent its other end and defining an end wall for said chamber at said one end of the body, said flange being secured to said body, a gland carried by said body for adjustment axially thereof for maintaining said packing under a predetermined compression against said shoulder, said inner ring having a plurality of circumferentially spaced radial openings therethrough in communication with said chamber to transmit the pressure sealing water entering into said chamber through the length of said sleeve and said flange to said body, said predetermined compression on said packing being greater than the pressure of the sealing water.

References Cited in the file of this patent
UNITED STATES PATENTS

| | | |
|---|---|---|
| 724,086 | Davis | Mar. 31, 1903 |
| 914,283 | Jackson | Mar. 2, 1909 |
| 1,081,725 | Dodge et al. | Dec. 16, 1913 |
| 1,307,901 | Farland et al. | June 24, 1919 |